(No Model.)

T. J. FEARNS.
COMBINATION TABLE.

No. 471,815. Patented Mar. 29, 1892.

Witnesses:
J. Staib
Chas. H. Smith

Inventor:
Thomas J. Fearns
per Lemuel W. Serrell, Atty.

(No Model.) 4 Sheets—Sheet 2.
T. J. FEARNS.
COMBINATION TABLE.
No. 471,815. Patented Mar. 29, 1892.
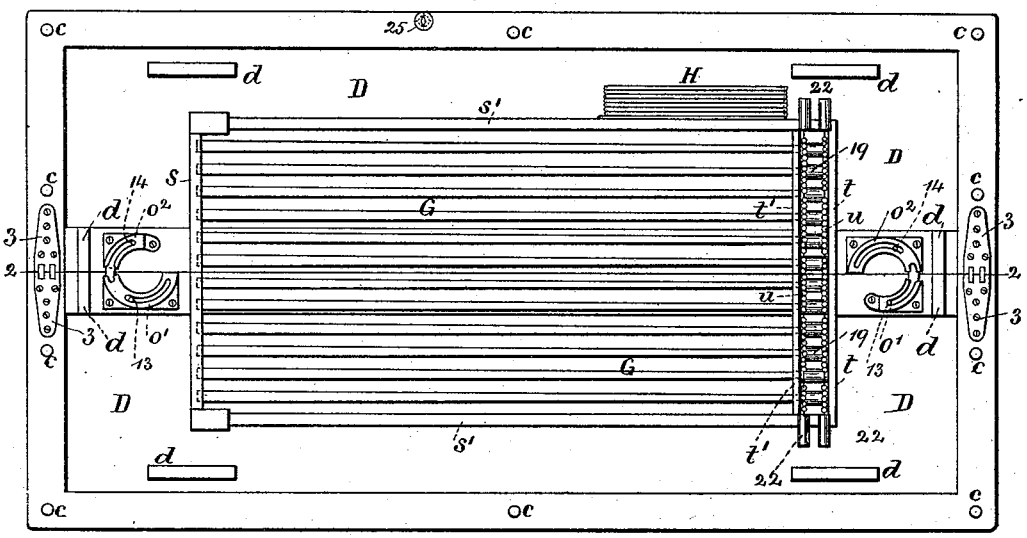
Fig. 3.
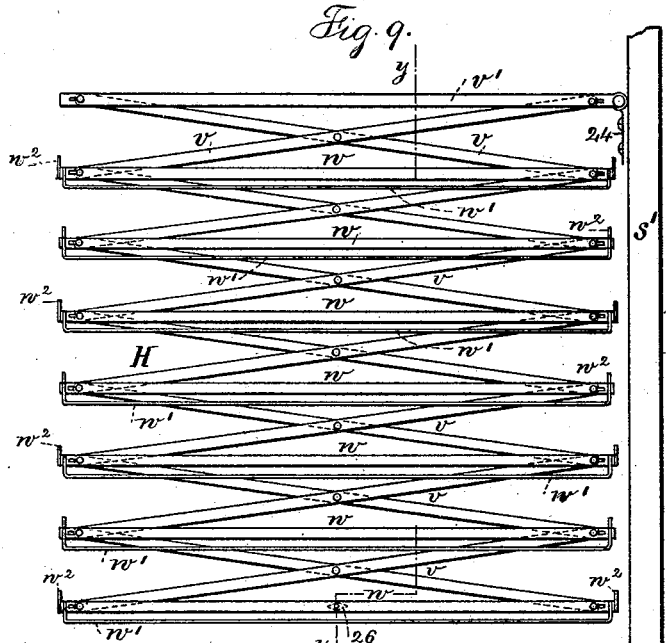
Fig. 9.
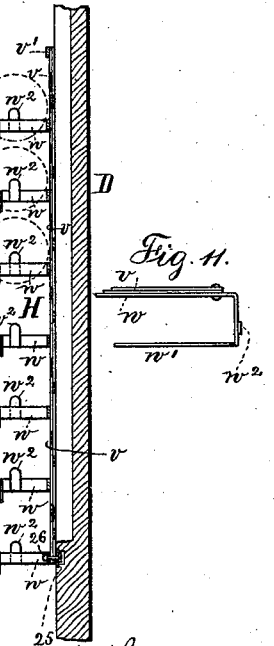
Fig. 10.
Fig. 11.
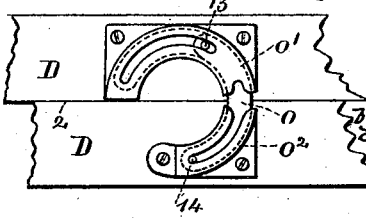
Fig. 12.
Witnesses:
J. Staib
Chas H Smith
Inventor:
Thomas J Fearns
by Lemuel W Serrell
atty.

(No Model.) 4 Sheets—Sheet 3.
T. J. FEARNS.
COMBINATION TABLE.
No. 471,815. Patented Mar. 29, 1892.
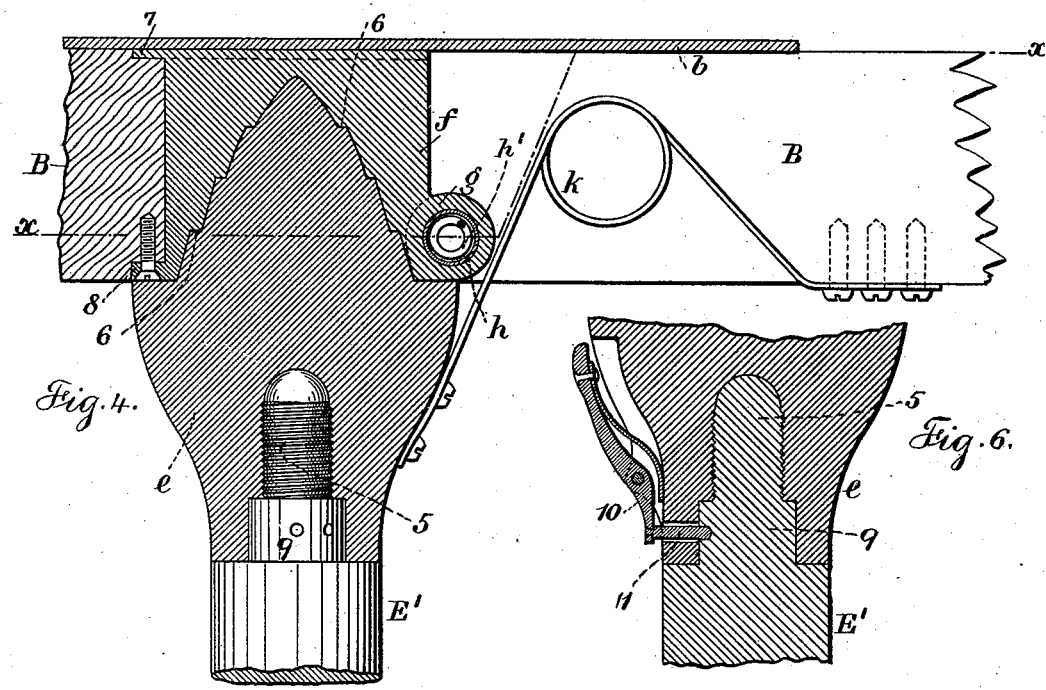
Fig. 4.
Fig. 6.
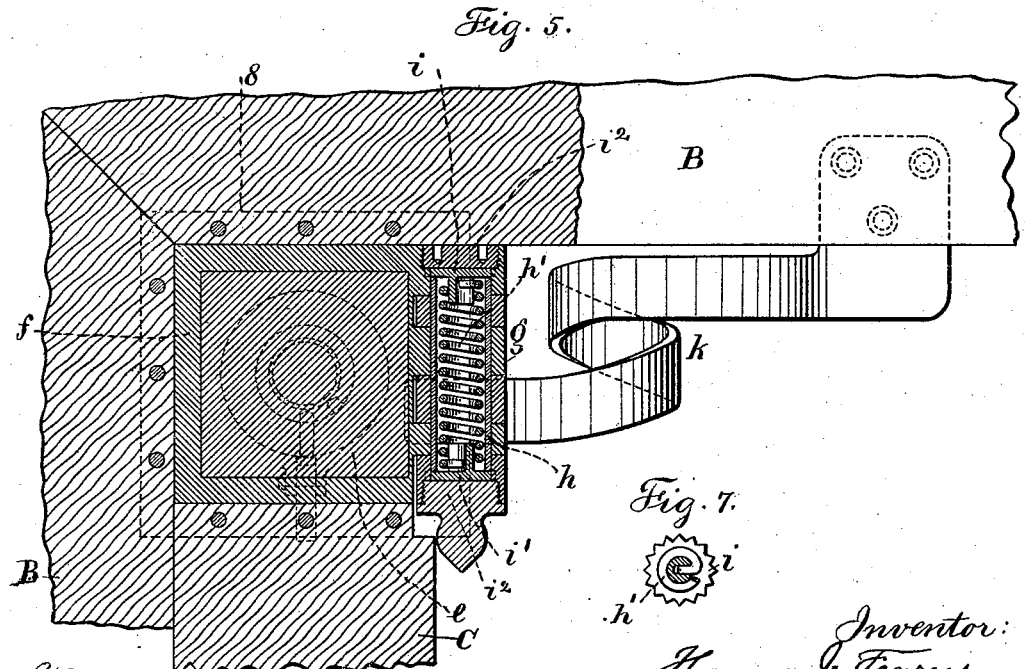
Fig. 5.
Fig. 7.
Witnesses:
J. Stait
Chas H. Smith
Inventor:
Thomas J. Fearns
per Lemuel W. Serrell atty (No Model.) 4 Sheets—Sheet 4.

T. J. FEARNS.
COMBINATION TABLE.

No. 471,815. Patented Mar. 29, 1892.

Witnesses:
J. Staib
Chas H. Smith

Inventor:
Thomas J. Fearns
per L. W. Serrell atty

UNITED STATES PATENT OFFICE.

THOMAS J. FEARNS, OF NEW YORK, N. Y.

COMBINATION-TABLE.

SPECIFICATION forming part of Letters Patent No. 471,815, dated March 29, 1892.

Application filed November 6, 1891. Serial No. 411,025. (No model.)

*To all whom it may concern:*

Be it known that I, THOMAS J. FEARNS, a citizen of the United States, residing in the city, county, and State of New York, have invented a new and useful Improvement in Combination-Tables, of which the following is a specification.

Combination-tables and other articles of furniture have heretofore been made, and combination-tables that were adapted for use as a billiard-table and dining or library table have also been made.

My invention relates to a combined billiard and library or dining table; and the object of my invention is to render such table complete in its adaptability to these uses, and also to provide legs that can be folded up beneath the table-body, so that the table can be set away and occupy the least possible room when temporarily dispensed with and not in use.

In carrying out my invention I employ a table-body with the usual side frame and with a removable top and folding legs. The bed of the table I make of metal, preferably of iron, with depending stiffening-ribs that are secured to the frame of the table, and I employ folding legs of peculiar construction that are curved backwardly at the corners and set at an angle of about forty-five degrees to the corner-faces of the table, and I employ a removable folding top that when in place adapts the table for use in a dining-room or library, and the top is to be removed and set or stood up as an easel when the table is used for billiards or pool, and on the under side of the top or cover are counters for billiards, the cues and a rack for the same, and the ball-rack for pool. These latter devices, being connected to the under side of the table-top, are concealed and out of the way when the top is in place upon the table and they are conveniently located for use when the top is stood up like an easel.

Figure 1:
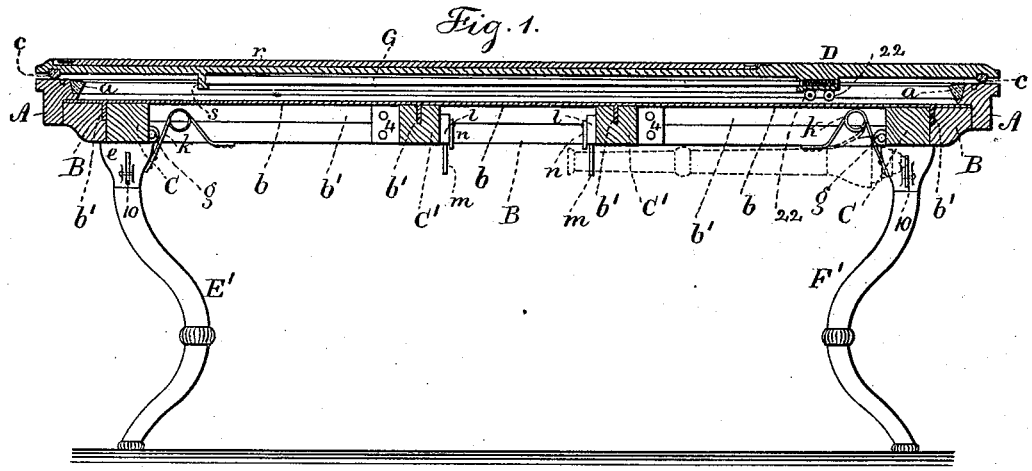
Figure 2:
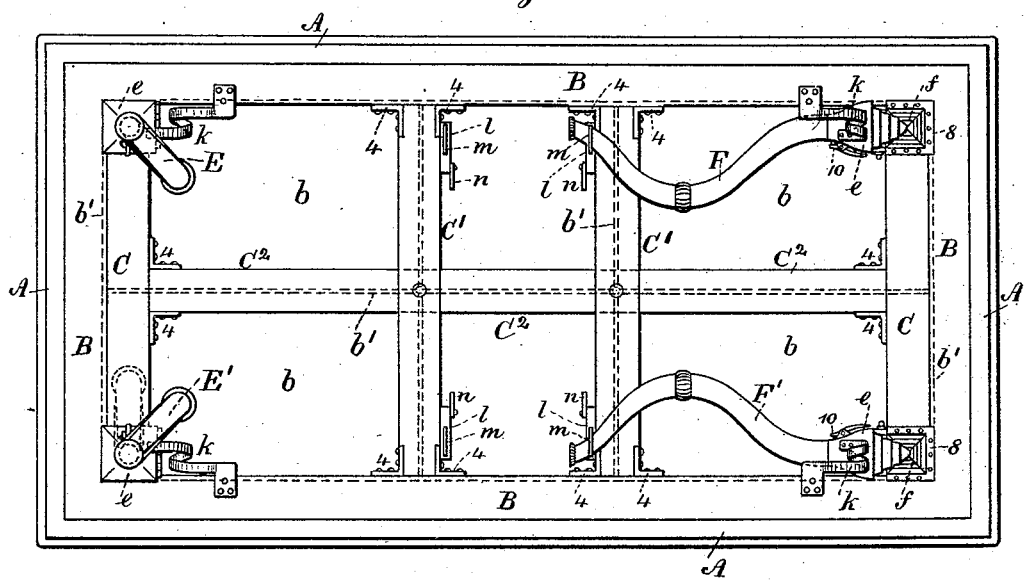
Figure 8:
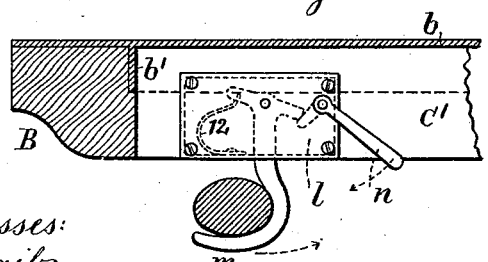

In the drawings, Figure 1 is a vertical longitudinal section of my combination-table complete. Fig. 2 is an inverted plan of the same with two of the legs folded. Fig. 3 is an inverted plan of the top. Fig. 4 is a vertical section of the leg-cap and socket, and Fig. 5 is a sectional plan at the line $x\,x$ of Fig. 4, Figs. 4 and 5 being in larger size. Figs. 6, 7, and 8 are detailed views of parts hereinafter more fully described. Fig. 9 is an elevation of the ball-rack opened out, and Fig. 10 is a cross-section of the same at the line $y\,y$ of Fig. 9. Fig. 11 is a partial sectional plan at one end of one rack. Fig. 12 is a plan of the device for locking the halves of the top when opened out flat and stood up as an easel. Figs. 13, 14, 15, 16, 17, 18, 19, and 20 are detailed views of parts of the removable top, hereinafter more fully described.

A represents the parts composing the outer frame, encircling the table and carrying the cushions $a$, secured to their inner face.

B represents the pieces composing the inner frame, connected in any usual manner to the outer frame A, and said frame B carries the bed-plate $b$. The bed-plate $b$ has depending ribs $b'$, preferably cast integral with the bed-plate $b$, and the said plate is secured upon the frame B, with the outer ribs $b'$ let into the inner vertical side faces of said frame. This bed-plate $b$, with its ribs $b'$ in one piece, I make of cast metal, preferably iron, with the upper face planed true and level. I prefer a one-piece metal bed, because the same is no heavier than slate, and is not liable to break or get out of level and does not require truing up, as is the case with a slate bed, and I believe that I am the first to employ an iron or metal bed. The iron bed is also superior to a wood bed, because the wood warps and twists and gets out of shape and level.

C C' C² represent the pieces composing the interior frame, the pieces C being at the respective ends and the intermediate pieces C' C² crossing centrally of the table. These pieces are connected together and to the frame B by angle-iron brackets 4, and the ribs $b'$ of the bed pass centrally through the pieces C' C² and across the pieces C.

D represents the removable top, which is made in halves divisible at the line 2, and the halves are connected by hinges 3, and I employ rubber blocks $c$ on the under side of the top to prevent the said top marring the surfaces of the frames A, and the guide-blocks $d$ are connected to the under side of the said top and adapted to fit inside the cushions $a$ to bring the top in register with the frames A, as will be seen in Figs. 1 and 3.

The folding legs are represented at E E' F

F', and they are by preference of curved form and set at the corners of the table and bent backwardly, and are at an angle of forty-five degrees to the corner faces of the table. This construction places the legs out of the way of those moving around the table in playing billiards or pool. The legs are made with metal caps $e$, having conical upper ends hinged to socket-blocks $f$, having conical recesses to receive said conical-ended caps, as shown in Fig. 4. The conical caps and recesses are each stepped off or provided with flat bearing-faces 6 to carry and distribute the weight and prevent wedging of the parts when together. These socket-blocks $f$ have flanges 7 8, by which they are connected at the corners of the frames B and C, and the frame-pieces C assist in keeping them in place.

Hinges $g$ unite the socket-blocks $f$ and leg-caps $e$, half the knuckles of the hinges being made with each of said parts, so that the outer or end knuckles at one end of the hinge are upon the socket-blocks and at the other end upon the leg-caps, and these end knuckles are recessed and internally threaded and their bases are serrated. A tube $h$ is placed within the knuckles of each hinge and forms a tubular pin for the same, and a spring $h'$ is employed within said tube and the ends of said spring engage the slotted stems of the end caps $i\ i'$. These end caps have serrated edges, as shown in Figs. 5 and 7, which fit within the serrated bases of the end knuckles. They are thus prevented from being turned by the action of the springs $h'$ when said springs are strained in folding the legs. Locking-caps $i^2$ screw into the threaded end knuckles and prevent the endwise movement of the end caps $i\ i'$.

I employ strong and heavy coiled springs $k$, the respective ends of which are connected to the frame-pieces B and leg-caps $e$, and these springs keep the legs in position when vertical, and when the legs are folded both the springs $h'$ and $k$ are strained and their tendency is to return the legs to a vertical position.

The respective legs are made with screw ends 5 and perforated cylindrical bases 9, adapted to enter the hollow lower ends of the leg-caps $e$, and I provide spring-latches 10, connected to the faces of the leg-caps, and latch-pins 11, passing through said leg-caps and entering the perforations of the bases 9, and the said legs are constructed in this manner because in the position shown in Figs. 1 and 2, as set at an angle of forty-five degrees to the corner faces of the table, it would not be possible for the legs to fold flat against the under side of the table, and these devices provide for imparting to the said legs an eighth of a revolution, so as to bring said legs parallel with the ends of the table previous to folding them.

I provide metal cases or boxes $l$, secured to the vertical opposite faces of the frame-pieces C', and a hook-arm $m$ is pivoted in each box and is held normally in the position shown in Fig. 8 by the spring 12, and each hook-arm has a T-head at the pivot, and pivoted in each of said boxes is a latch $n$, whose inner portion is adapted to engage one arm of the T-head to move the same and the hook-arm in the direction of the arrow to release the leg. The office of the hook-arms $m$ and springs 12 is to hold the lower ends of the legs when in a folded condition and the office of the latch $n$ to release the legs, so that they can be turned into a vertical position.

The removable top D is divided longitudinally upon the line 2, and the parts are hinged together by link hinges 3, secured to the underside and having curved knuckle ends and links that come to the surface or face side. (See Fig. 15.) The table-top can thus be folded with the faces together, and in use the leaves of the hinge are concealed. I employ segmental sliding bolts $o$ and their sockets $o'\ o^2$ for connecting the halves of the removable top, so as to prevent them folding. (See Figs. 3 and 12.) The bolt-sockets $o'\ o^2$ are secured to the respective halves upon the under face of the removable top D, the sockets $o'$ being slotted for the retaining-pins 13 of the bolts and the sockets $o^2$ being grooved for the pins 14 of the bolts $o$. These bolts are employed especially when the top is stood up as an easel, (see Fig. 18,) and in which position the brace or leg $r$ is brought into play. This brace or leg closes up into the table-top when not employed and appears as part of said top, Fig. 17, and is connected to said top at one end by a hinge. I have shown in Fig. 19 a form of strap-hinge wherein there is a face portion 15 upon the top D and a right-angled portion 16 connected to the back of the brace $r$; but any desired form of hinge may be made use of. The lower end of the brace $r$ may be caught by any suitable catch or spring-bolt. I have shown one at 17, and at 18 is a spring for raising the free end of the brace so that it can be grasped. (See Fig. 20.)

Figure 13:
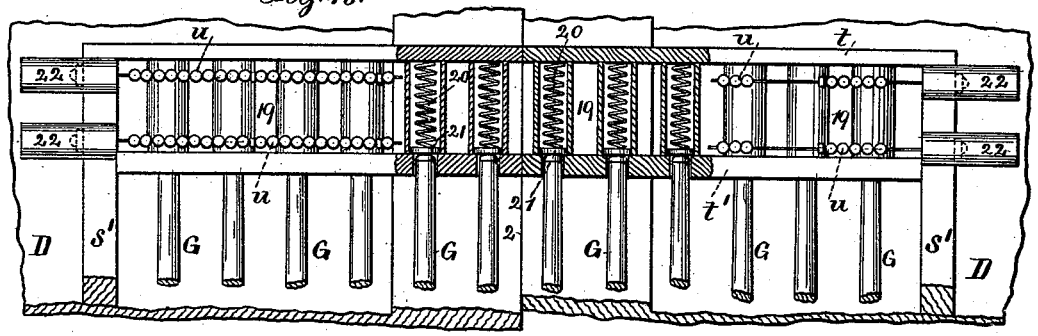
Figure 14:
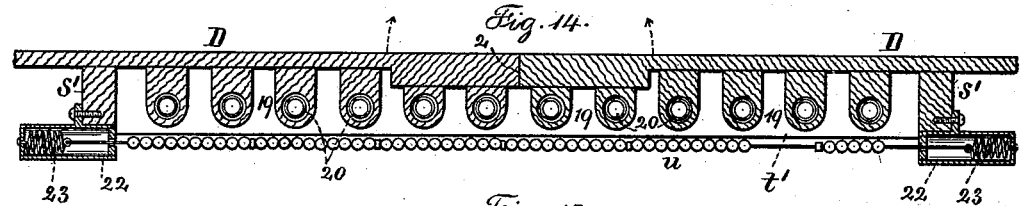
Figure 15:
Figure 16:
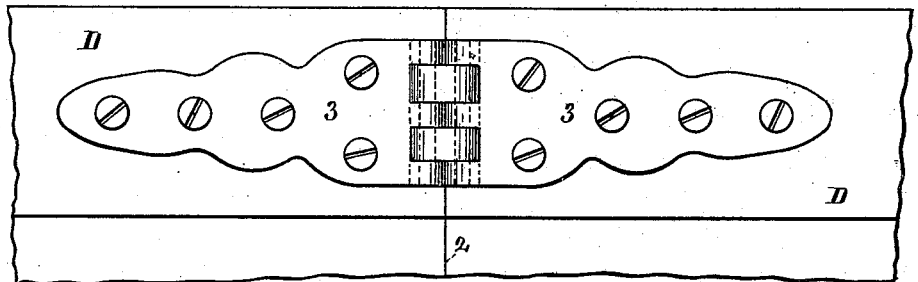
Figure 17:
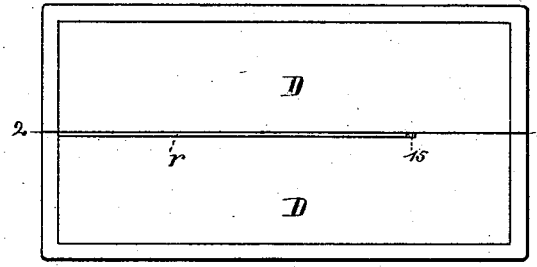
Figure 19:
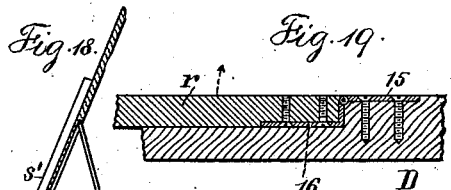
Figure 18:
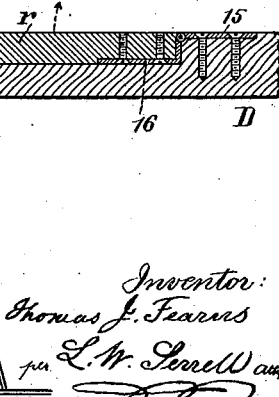
Figure 20:
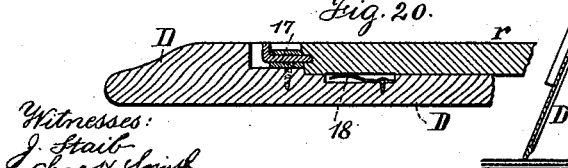

The rack for the cues G is connected to the under side of the removable top and is composed of the base-frame $s$, side frames $s'\ s'$, and the top frames $t$ and $t'$, Figs. 3, 13, and 14. The frame $t$ is imperforate, but the frame $t'$ is perforated for the pointed ends of the cues, and the frame $s$ is recessed for the large ends of the cues. (See Figs. 3 and 13.) Between the frames $t$ and $t'$ are short cylindrical blocks 19, (these may be made collectively and of metal,) and in these cylinders are helical springs 20 and disks 21, and these are in axial line with the perforations of the frames, so that the tips of the cues in passing through the perforations of the frame $t'$ bear against the disks 21, compress the springs 20, and are thus held in place so that the top D can be moved about without the cues dropping out of place in the rack. (See Fig. 13.)

The usual numbered markers $u$ are strung upon wires whose respective ends pass into cylinders 22, secured to the side frames s', and are connected to helical springs 23. The outer ends of these springs are secured to the outer cylinder-heads, and said springs yield as the removable cover D is folded. (See Figs. 13 and 14.)

The ball-rack H (see Figs. 3, 9, 10, and 11) is composed of the lazy-tong arms v v, pivotally suspended from an upper bar v', which is hinged at one end to a plate 24, secured to the side frame s' in such a manner that when collapsed it can be folded up against the said frame in the position shown in Fig. 3. Bars w, with their ends bent at right angles, are connected to the end pivots of the arms v, and these bars w, together with the bar v', are slotted at said end pivots for the movement of the pivots when the lazy-tong bars close together and the bars w are brought edge to edge. Horizontal wires w' with upturned ends are connected, as shown, to the ends of the bars w, and these wires w', as will be seen from Fig. 10, are set alternately upon the end of said bars w and near thereto, so that when the lazy-tong bars are shut up these wires nest into a small compass. Plates $w^2$ are connected alternately to opposite sides of the end portions of the bars w, so that they will also nest when the lazy-tong bars are shut up. The wires w' form supports for the balls, and the end plates $w^2$ prevent such balls rolling off at the ends of the ball-rack. This rack is specially useful for the balls employed in playing pool. The table represented in the drawings is not shown with the pockets that are made use of in playing pool; but these pockets when provided are of usual character and are fitted in the ordinary manner.

On the under face of the removable top is a recessed plate 25 with an opening, and on the back of the lower bar w is a catch-block 26, adapted to engage the plate 25, so as to hold the ball-rack in position when opened, as in Fig. 9.

I claim as my invention—

1. The combination, with the frames composing the table-top, of a cast-iron bed-plate in one piece and having integral ribs upon the under side, the bed resting upon said frames and its ribs being received in grooves therein, substantially as set forth.

2. The combination, with the frame A and the cushions a, of the frame B, the cross and end frames within and connected to the frame B and to each other, and a cast-iron bed-plate having integral ribs upon the under side received into grooves in said frames, substantially as set forth.

3. The combination, with the frames composing the table-top and the bed, of legs curved or bowed backwardly at the corners and set in vertical planes bisecting the corner angles, and joints for connecting the legs to the frames, so that they can fold against the under side of the table-top, substantially as set forth.

4. The combination, with the frames composing the table-top and the legs, of the conical-ended leg-caps e, and the socket-blocks f, connected to the frames and having a conical opening and hinged to the leg-caps e, said legs being adapted to fold, substantially as set forth.

5. The combination, with the frames composing the table-top and the legs, of the conical-ended leg-caps e, the socket-blocks f, connected to the frames and having a conical opening, hinges to connect the leg-caps e, and the coiled springs connected to the said frames and leg-caps for holding the legs vertically in place, substantially as set forth.

6. The combination, with the frames composing the table-top and the legs, of the conical-ended leg-caps e, the socket-blocks f, connected to the frames and having conical recesses for the leg-caps, the spring-hinges g and coiled springs k, and the hook-arms m for holding the legs in a folded condition, so that when released the springs of the hinges g and the springs k return the legs to a vertical position, substantially as set forth.

7. The combination, with the frames and hinged folding legs, of the metal cases l, the pivoted hook-arms m, having T-heads at their pivots, springs 12, engaging the arms of the T-heads at one side, and pivoted latches n, having inner portions adapted to engage the other arms of the T-heads for holding up or releasing the legs, substantially as set forth.

8. The combination, with the frames and folding legs, of the leg-caps e, having conical ends, and the socket-blocks f, having conical recesses, both conical ends and recesses being stepped off or provided with flat bearing-faces 6 to carry and distribute the weight, substantially as set forth.

9. The combination, with the conical leg-caps and socket-blocks having conical recesses and the hinge-knuckles, half of which are made with each part, of the tubes h, forming the hinge-pins, the helical springs h', the end caps i i', engaging the ends of the springs and having serrated peripheries adapted to set in the serrated bases of the respective end knuckles, and the locking-caps $i^2$, substantially as set forth.

10. The combination, with the legs and the conical leg-caps and socket-blocks hinged together, of the screw ends 5 and perforated cylindrical bases thereto at the upper ends of the legs, the spring-latches 10, and latch-pins 11, whereby a partial rotation may be given to the legs, substantially as set forth.

11. The combination, with the frames, legs, and cushions composing the billiard or pool table, of the removable top D, divided into halves upon the line 2, the connecting-hinges 3, the guide-blocks d, the segmental sliding bolts o and sockets o', and the rubber blocks c, substantially as set forth.

12. The combination, with the frames, legs, and cushions composing the billiard or pool table, of the removable top d, the cue-rack, ball-rack H, markers $n$, connected to the under side of said top, and the leg or brace $r$ for supporting said top when removed and set up on end in an inclined position, substantially as set forth.

13. The combination, with the removable top D, having a plain upper face, of the base-frame $s$, having recesses, the side frames $s'$, the top frame $t$, the perforated top frame $t'$, the short cylinders 19 between the frames $t\,t'$, the helical springs 20, and disks 21, the same constituting the cue-rack upon the under side of the table-top, substantially as set forth.

14. The combination, with the removable top D, having a plain upper face, of the frame $s'$, the lazy-tong arms $v$, the top arm $v'$, hinged to the frame $s'$, the bars $n$, pivoted to the ends of the arms $v$ and having bent ends, and the bars or wire for carrying the balls, substantially as set forth.

15. The combination, with the lazy-tong arms $v$ and top arm $v'$, of the bars $w$, pivoted to the ends of the arms $v$ and having bent ends, the wires $w'$, and plates $w^2$, said wires and plates being connected to the arms $w$ alternately, so as to nest when folded, substantially as set forth.

16. The combination, with the removable top D, having a plain upper face, of the markers $n$ and their wires, the cylinders 22, secured to the under side of the top upon the frames $s'$, and the helical springs 23 at the ends of the wires within the cylinders, whereby the springs yield as the removable top is folded, substantially as set forth.

Signed by me this 29th day of October, A. D. 1891.

THOS. J. FEARNS.

Witnesses:
GEO. T. PINCKNEY,
HAROLD SERRELL.